United States Patent
Tanaka

(10) Patent No.: US 12,309,348 B2
(45) Date of Patent: May 20, 2025

(54) MOVING BODY AND MOVING BODY CONTROL METHOD

(71) Applicant: SONY GROUP CORPORATION, Tokyo (JP)

(72) Inventor: Hirotaka Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 27 days.

(21) Appl. No.: 18/257,604

(22) PCT Filed: Nov. 12, 2021

(86) PCT No.: PCT/JP2021/041683
§ 371 (c)(1),
(2) Date: Jun. 15, 2023

(87) PCT Pub. No.: WO2022/137876
PCT Pub. Date: Jun. 30, 2022

(65) Prior Publication Data
US 2024/0114121 A1    Apr. 4, 2024

(30) Foreign Application Priority Data
Dec. 23, 2020 (JP) .................... 2020-213750

(51) Int. Cl.
*H04N 13/296* (2018.01)
*G06T 7/593* (2017.01)
(Continued)

(52) U.S. Cl.
CPC .......... *H04N 13/296* (2018.05); *G06T 7/593* (2017.01); *G06T 7/85* (2017.01); *H04N 13/239* (2018.05);
(Continued)

(58) Field of Classification Search
CPC ........ G01B 11/245; G01C 3/06; G03B 15/00; G03B 35/08; G05D 1/02; G06T 2207/30252; G06T 7/593; G06T 7/85
See application file for complete search history.

(56) References Cited

U.S. PATENT DOCUMENTS

| | | | |
|---|---|---|---|
| 10,607,310 | B1 | 3/2020 | Thomas |
| 2012/0133739 | A1* | 5/2012 | Morimitsu ............. G01C 11/06 348/46 |

(Continued)

FOREIGN PATENT DOCUMENTS

| | | |
|---|---|---|
| JP | 2001-305681 A | 11/2001 |
| JP | 2004-093457 A | 3/2004 |

(Continued)

OTHER PUBLICATIONS

International Search Report and Written Opinion of PCT Application No. PCT/JP2021/041683, issued on Feb. 1, 2022, 08 pages of ISRWO.

*Primary Examiner* — Md N Haque
(74) *Attorney, Agent, or Firm* — CHIP LAW GROUP

(57) ABSTRACT

Provided is a moving body that includes a stereo camera including a first imaging unit and a second imaging unit. The moving body further incudes a base length changing unit that moves at least one of the first imaging unit and the second imaging unit so as to change a base length between the first imaging unit and the second imaging unit, and a moving body control unit that controls the base length changing unit such that the base length is adjusted to a target base length according to a state variable indicating information of a variable imaging state of the first imaging unit and the second imaging unit.

11 Claims, 9 Drawing Sheets

(51) Int. Cl.
    *G06T 7/80*         (2017.01)
    *H04N 13/239*     (2018.01)
    *H04N 23/695*     (2023.01)

(52) U.S. Cl.
    CPC . *H04N 23/695* (2023.01); *G06T 2207/30252* (2013.01)

(56) References Cited

U.S. PATENT DOCUMENTS

| | | | | |
|---|---|---|---|---|
| 2017/0251193 | A1* | 8/2017 | Zhou | H04N 13/239 |
| 2019/0236538 | A1* | 8/2019 | Kaneko | H04W 4/40 |
| 2022/0319151 | A1* | 10/2022 | Kim | G06V 10/28 |

FOREIGN PATENT DOCUMENTS

| | | | | |
|---|---|---|---|---|
| JP | 2010-223864 | A | | 10/2010 |
| JP | 2011145143 | A | * | 7/2011 |
| JP | 2013-513095 | A | | 4/2013 |
| JP | 2017-505903 | A | | 2/2017 |
| WO | 2019/244668 | A1 | | 12/2019 |

\* cited by examiner

MOVING BODY AND MOVING BODY CONTROL METHOD

CROSS REFERENCE TO RELATED APPLICATIONS

This application is a U.S. National Phase of International Patent Application No. PCT/JP2021/041683 filed on Nov. 12, 2021, which claims priority benefit of Japanese Patent Application No. JP 2020-213750 filed in the Japan Patent Office on Dec. 23, 2020. Each of the above-referenced applications is hereby incorporated herein by reference in its entirety.

TECHNICAL FIELD

The present disclosure relates to a moving body, a moving body control method, and a program.

BACKGROUND ART

A stereo camera system can image the object from a plurality of directions with a stereo camera to acquire information in the depth direction of the object in addition to an image of the object. Therefore, stereo cameras have come to be used in various fields where stereoscopic vision and distance measurement of the object are required (see Patent Documents 1 to 3).

CITATION LIST

Patent Document

Patent Document 1: International Patent Application Publication No. 2019/244668
Patent Document 2: Japanese Patent Application Laid-Open No. 2001-305681
Patent Document 3: Japanese Patent Application Laid-Open No. 2004-93457

SUMMARY OF THE INVENTION

Problems to be Solved by the Invention

In a stereo camera system using a stereo matching technology based on a triangulation principle, the maximum distance and the minimum distance in the depth direction that can be appropriately imaged by a stereo camera are determined according to a base length between imaging units.

In a case where the base length between the imaging units is short, distance measurement for an object located at a short distance (short-distance object) can be performed with high accuracy, but a large measurement error is likely to occur in distance measurement for an object located at a long distance (long-distance object). On the other hand, in a case where the base length between the imaging units is long, distance measurement for a long-distance object can be performed with high accuracy, but there is a case where a short-distance object is out of the imaging range and cannot be imaged at all.

As described above, in a stereo camera, the possibility of imaging a short-distance object and the distance measurement accuracy of a long-distance object are in a trade-off relationship, and it is difficult to achieve both at a high level at the same time by a single stereo camera in terms of a structural principle, and it is difficult to cope with this issue even by using software processing. Therefore, in a moving body such as a vehicle or a flight vehicle, for example, a hardware design including both a stereo camera for short-distance imaging and a stereo camera for long-distance imaging has been required.

In view of the foregoing, the present disclosure provides a technology for enabling appropriate imaging of both an object located at a short distance and an object located at a long distance by a stereo camera depending on the situation.

Solutions to Problems

One aspect of the present disclosure relates to a moving body including: a stereo camera including a first imaging unit and a second imaging unit; a base length changing unit that moves at least one of the first imaging unit and the second imaging unit so as to change a base length between the first imaging unit and the second imaging unit; and a moving body control unit that controls the base length changing unit such that the base length is adjusted to a target base length according to a state variable indicating information of a variable imaging state of the first imaging unit and the second imaging unit.

The state variable may include information regarding at least one of the moving speed of the moving body, the inclination of the imaging direction of the first imaging unit and the second imaging unit, and the altitude of the moving body.

The moving body may include an imaging state measurement unit that measures the state variable. The moving body control unit may control the base length changing unit such that the base length is adjusted to the target base length according to the state variable acquired from the imaging state measurement unit.

The moving body may include a moving body drive unit that drives the moving body. The moving body control unit may receive drive instruction information and control the moving body drive unit on the basis of the drive instruction information; the drive instruction information may include information regarding the state variable; and the moving body control unit may control the base length changing unit such that the base length is adjusted to the target base length according to the state variable acquired on the basis of the drive instruction information.

The moving body control unit may derive a distance to a target object on the basis of imaging data acquired by the first imaging unit and imaging data acquired by the second imaging unit.

The moving body control unit may estimate a self-position and create a map of a surrounding environment on the basis of imaging data acquired by the first imaging unit and imaging data acquired by the second imaging unit.

The moving body control unit may determine the target base length on the basis of the state variable.

The moving body control unit may determine the target imaging range on the basis of the state variable, and determine the target base length on the basis of the target imaging range.

The moving body control unit may acquire a stereo camera imaging range included in both an imaging range of the first imaging unit and an imaging range of the second imaging unit based on the current base length, and determine the target base length on the basis of a comparison between the target imaging range and the stereo camera imaging range.

The moving body control unit may acquire a maximum target distance indicating a maximum distance of the target imaging range and a minimum target distance indicating a minimum distance of the target imaging range on the basis of the state variable, acquire a maximum imaging distance indicating a maximum distance of the stereo camera imaging range and a minimum imaging distance indicating a minimum distance of the stereo camera imaging range based on the current base length, and determine the target base length on the basis of the maximum target distance, the minimum target distance, the maximum imaging distance, and the minimum imaging distance.

The moving body may be provided as a vehicle.

The moving body may be provided as a flight vehicle.

Another aspect of the present disclosure relates to a moving body control method including moving at least one of a first imaging unit and a second imaging unit included in a moving body such that a base length between the first imaging unit and the second imaging unit is adjusted to a target base length according to a state variable indicating information regarding a variable imaging state of the first imaging unit and the second imaging unit.

MODE FOR CARRYING OUT THE INVENTION

Hereinafter, a technology related to a base length-variable robot capable of changing a range (i.e., depth range) in the depth direction of imaging and distance measurement by changing a base length of a stereo camera will be exemplarily described.

The application target of the technology described below is not limited, and the technology described below can be applied to general moving bodies.

For example, the following technology can be applied to a moving body provided as a vehicle or a flight vehicle (e.g., drone or unmanned aerial vehicle). In particular, the following technology can be applied not only to a moving body that moves according to an operation of an operator but also to a moving body that can move autonomously without intervention of the operation of the operator. As described above, the following technology can also be applied to an autonomous mobile robot or an unmanned aerial vehicle that uses a stereo camera as a passive sensor, measures the distance of the outside world, recognizes the 3D structure of the surrounding environment, and moves autonomously.

Examples of such a moving body include a moving body that carries a load (e.g., automated guided vehicle (AGV)), a moving body that performs imaging while tracking a target, and a moving body that performs simultaneous localization and mapping (SLAM) processing. The moving body that performs SLAM processing can estimate its own position and create a map of the surrounding environment on the basis of the captured image of the stereo camera, and can be used in various fields such as a robot cleaner and an area inspection robot. SLAM is a technical field and operation itself that are widely spread as a space recognition technology of robots, and is one of fields to which the technology described below contributes.

Figure 1:
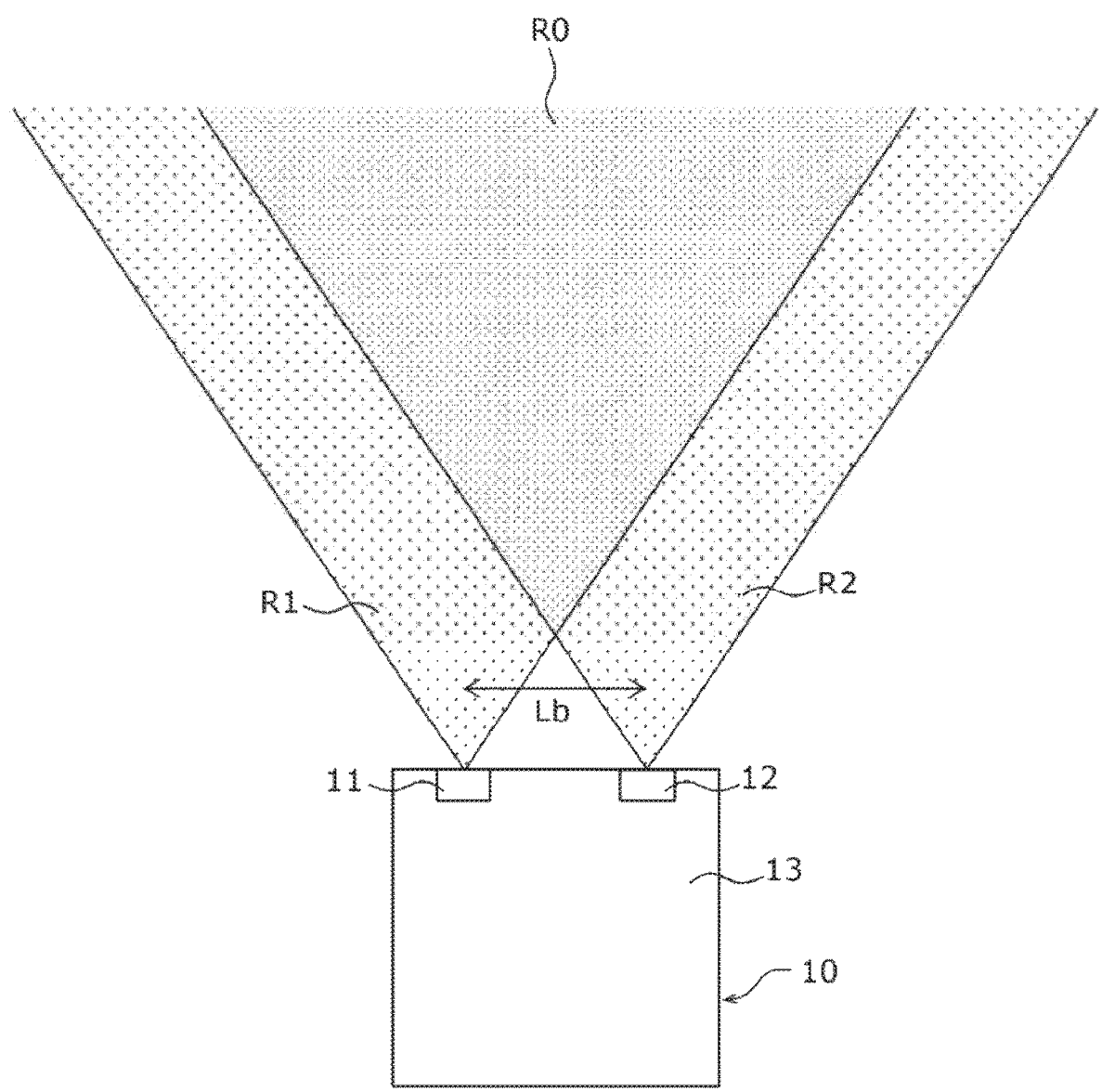
FIG. 1 is a schematic diagram for describing an imaging range of a stereo camera mounted on a moving body.

FIG. 1 is a schematic diagram for describing an imaging range of a stereo camera mounted on a moving body 10.

In the moving body 10 illustrated in FIG. 1, a first imaging unit 11 and a second imaging unit 12 provided as stereo cameras are mounted on a moving body main body 13.

An imaging direction (i.e., depth direction of imaging range) of the first imaging unit 11 and the second imaging unit 12 is directed to the front of the moving body 10, and the first imaging unit 11 and the second imaging unit 12 image an object located at the front.

In FIG. 1, a triangular area extending upward from the first imaging unit 11 schematically indicates the imaging range (i.e., first imaging range R1) of the first imaging unit 11. Similarly, a triangular area extending upward from the second imaging unit 12 schematically indicates the imaging range (i.e., second imaging range R2) of the second imaging unit 12.

A range included in both the first imaging range R1 and the second imaging range R2 (i.e., overlapping range) is the imaging range of the stereo camera (i.e., stereo camera imaging range R0).

For an object included in the stereo camera imaging range R0, distance measurement (i.e., measurement of depth direction distance) can be performed from images acquired by the first imaging unit 11 and the second imaging unit 12. On the other hand, for an object located outside the stereo camera imaging range R0, in principle, the depth direction distance cannot be derived from images acquired by the first imaging unit 11 and the second imaging unit 12.

The stereo camera imaging range R0 changes according to a base length Lb indicating the distance between the first imaging unit 11 and the second imaging unit 12 (e.g., distance between objective lens of first imaging unit 11 and objective lens of second imaging unit 12). As is clear from FIG. 1, as the base length Lb increases (becomes longer), the stereo camera imaging range R0 moves away from the moving body 10. On the other hand, as the base length Lb decreases (becomes shorter), the stereo camera imaging range R0 approaches the moving body 10.

Therefore, in a case where an object located near the moving body 10 is imaged, the base length Lb needs to be sufficiently small.

Figure 2:
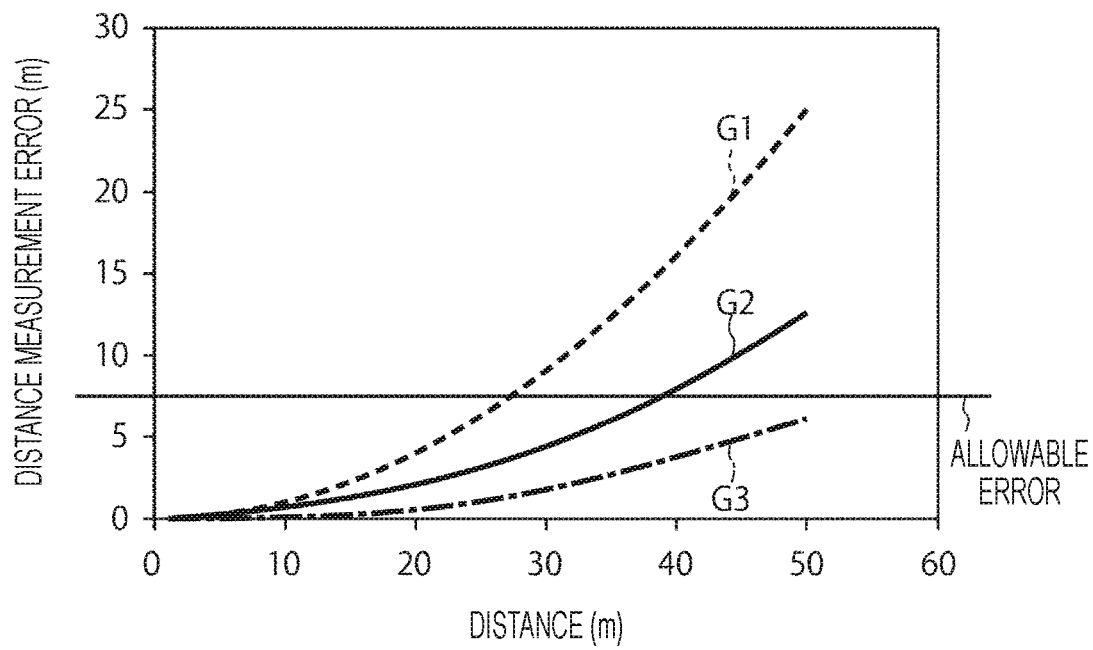
FIG. 2 is a diagram illustrating an example of a relationship between an imaging distance of a stereo camera and a distance measurement error.

FIG. 2 is a diagram illustrating an example of a relationship between an imaging distance of a stereo camera and a distance measurement error. In FIG. 2, the horizontal axis represents the distance (m: meter) from the stereo camera, and the vertical axis represents the magnitude (m) of the distance measurement error.

In FIG. 2, "G1" indicates a case where the base length is relatively small, "G2" indicates a case where the base length is medium, and "G3" indicates a case where the base length is relatively large (i.e., "base length of G1<base length of G2<base length of G3"). The relationship example illustrated in FIG. 2 is based on an experimental result, and the relationship example of "G1", "G2", and "G3" illustrated in FIG. 2 is obtained by varying the base length while maintaining the same conditions other than the base length.

As is clear from FIG. 2, in long-distance imaging, the distance measurement error tends to decrease as the base length Lb of the stereo camera increases, and the distance measurement error tends to increase as the base length Lb decreases. Therefore, in a case where an object located far from the moving body 10 is imaged, it is advantageous that the base length Lb is large, and the distance measurement accuracy is not necessarily good if the base length Lb is small.

Therefore, the actual stereo camera imaging range R0 is determined to be a range in which the distance measurement error is equal to or less than an allowable value (i.e., "allowable error").

Note that the allowable value of the distance measurement error may vary depending on the application and use situation of the moving body 10. Therefore, the allowable value of the distance measurement error may be variable depending on the application and use situation of the moving body 10.

As described above, in imaging using a stereo camera, it is advantageous that the base length Lb is small in imaging of a short-distance object (i.e., short-distance imaging), and it is advantageous that the base length Lb is long in imaging of a long-distance object (i.e., long-distance imaging). Therefore, by reducing the base length Lb at the time of short-distance imaging and increasing the base length Lb at the time of long-distance imaging, it is possible to appropriately image both a short-distance object and a long-distance object with a single stereo camera.

Figure 3:
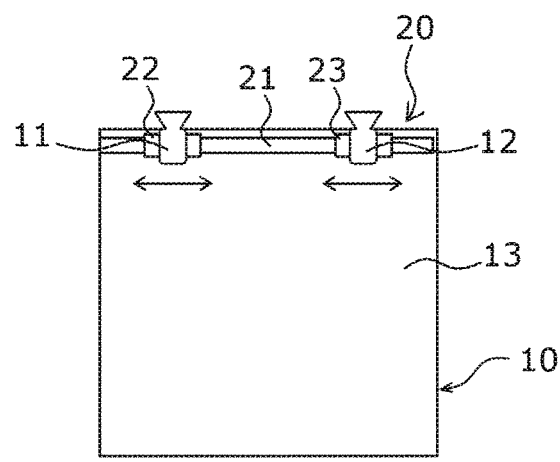
FIG. 3 is a plan view illustrating a schematic configuration of an example of a moving body on which a stereo camera capable of changing a base length is mounted.
Figure 4:
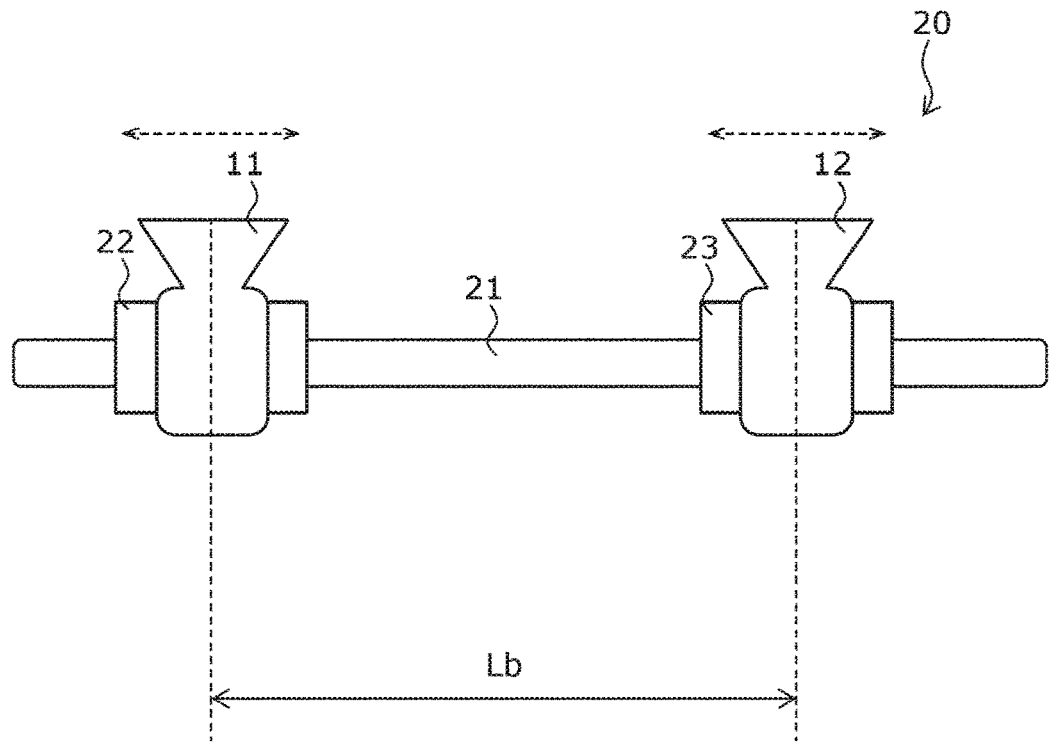
FIG. 4 is an enlarged plan view illustrating a first imaging unit, a second imaging unit, and a base length changing unit illustrated in FIG. 3.

FIG. 3 is a plan view illustrating a schematic configuration of an example of the moving body 10 on which a stereo camera capable of changing the base length Lb is mounted. FIG. 4 is an enlarged plan view illustrating the first imaging unit 11, the second imaging unit 12, and a base length changing unit 20 illustrated in FIG. 3.

The moving body 10 illustrated in FIGS. 3 and 4 includes a stereo camera including the first imaging unit 11 and the second imaging unit 12, the base length changing unit 20 that changes the base length Lb of the stereo camera, and the moving body main body 13 on which the stereo camera and the base length changing unit 20 are fixedly mounted.

Although not illustrated, a movement driving device for moving the moving body 10 is attached to the moving body main body 13. The movement driving device is not limited, and for example, a prime mover such as an engine or a motor, wheels, and a propeller can be included in the movement driving device.

The base length changing unit 20 can be configured by any device capable of moving at least one of the first imaging unit 11 and the second imaging unit 12 so as to change the base length Lb between the first imaging unit 11 and the second imaging unit 12.

The base length changing unit 20 illustrated in FIGS. 3 and 4 includes a slide guide 21 and movable stages 22 and 23 movable along the slide guide 21. The slide guide 21 can be configured by, for example, a ball bearing or a linear motion guide (LM guide).

The first imaging unit 11 and the second imaging unit 12 are fixed to the movable stages 22 and 23, respectively, and the movable stages 22 and 23 move together with the first imaging unit 11 and the second imaging unit 12 while being guided by the slide guide 21. Each of the movable stages 22 and 23 is mounted with, for example, a motor, is moved symmetrically in a direction parallel to the slide guide 21 by power output from the motor, and can be stopped at a desired position.

Note that the base length changing unit 20 is not limited to the device configuration illustrated in FIGS. 3 and 4.

For example, both the first imaging unit 11 and the second imaging unit 12 may be moved by power from a single drive source. As an example, although not illustrated, a pinion may be attached to the rotation shaft of the motor, and the first imaging unit 11 and the second imaging unit 12 may be attached to each of two rod-shaped racks engaged with the pinion. In this case, the first imaging unit 11 and the second imaging unit 12 are simultaneously moved symmetrically according to the rotation of the motor rotation shaft to adjust the base length Lb.

The base length changing unit 20 of the present embodiment adjusts the base length Lb of the first imaging unit 11 and the second imaging unit 12 to a target base length under the control of a moving body control unit (see FIG. 7 and the like) to be described later.

The target base length is a base length Lb for setting the depth direction range of the stereo camera imaging range R0 to a desired range.

The target base length of the present embodiment is determined according to a state variable.

The "state variable" mentioned here represents the state of the first imaging unit 11 and the second imaging unit 12, and may include, for example, any of the moving speed, inclination, and altitude of the first imaging unit 11 and the second imaging unit 12.

Therefore, the moving body 10 of the present embodiment can optimize the base length Lb according to the imaging state and adaptively change the range in the depth direction of the stereo camera imaging range R0 according to the imaging state. As a result, it is possible to appropriately image and measure the distance of both a short-distance object and a long-distance object with a single stereo camera depending on the situation. Note that "adaptively changing the range in the depth direction of the stereo camera imaging range R0 according to the imaging state" mentioned here includes both a case where the range in the depth direction is changed stepwise and a case where the range is changed steplessly.

The above-described state variable may include any information that may affect the determination of the desired imaging distance range. Typically, the state variable can include information regarding at least one of information regarding the moving speed of the moving body 10, information regarding the inclination of the imaging direction of the first imaging unit 11 and the second imaging unit 12, and information regarding the altitude of the moving body 10. The moving speed of the moving body 10 mentioned here basically coincides with the moving speeds of the first imaging unit 11 and the second imaging unit 12 mounted on the moving body 10. Similarly, the altitude of the moving body 10 basically coincides with the altitudes of the first imaging unit 11 and the second imaging unit 12 mounted on the moving body 10.

In general, in a case where the moving speed of the moving body 10 is low, the stereo camera mounted on the moving body 10 is often desired to perform short-distance imaging, and in a case where the moving speed of the moving body 10 is high, the stereo camera mounted on the moving body 10 is often desired to perform long-distance imaging.

As an example, in a case where the moving body 10 is provided as a vehicle, information on an object located at a short distance is usually required in a parking lot where slow traveling is required, whereas information on an object located at a long distance is required on a road where high-speed traveling is required. Therefore, normally, in a case where the moving speed of the moving body 10 is low, the base length Lb of the stereo camera is preferably set to be relatively small, and in a case where the moving speed of the moving body 10 is high, the base length Lb of the stereo camera is preferably set to be relatively large.

Note that the information regarding the moving speed of the moving body 10 may be information directly indicating the moving speed of the moving body 10 or may be information indirectly indicating the moving speed of the moving body 10.

For example, acceleration information of the moving body 10 may be used as the information regarding the moving speed of the moving body 10. In a case where the positive acceleration of the moving body 10 is large, it is usually required to move the moving body 10 fast, and the base length Lb of the stereo camera is preferably set to be relatively large. On the other hand, in a case where the negative acceleration (i.e., deceleration) of the moving body 10 is large, it is usually required to move the moving body 10 slowly, and the base length Lb of the stereo camera is preferably set to be relatively small.

Figure 5:
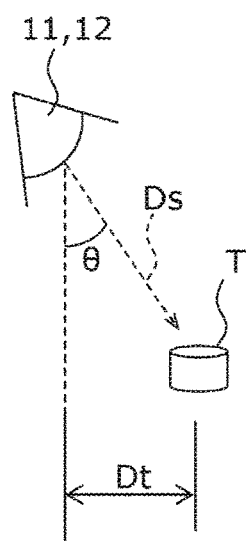
FIG. 5 is a diagram schematically illustrating an example of an imaging direction of a first imaging unit and a second imaging unit in short-distance imaging.
Figure 6:
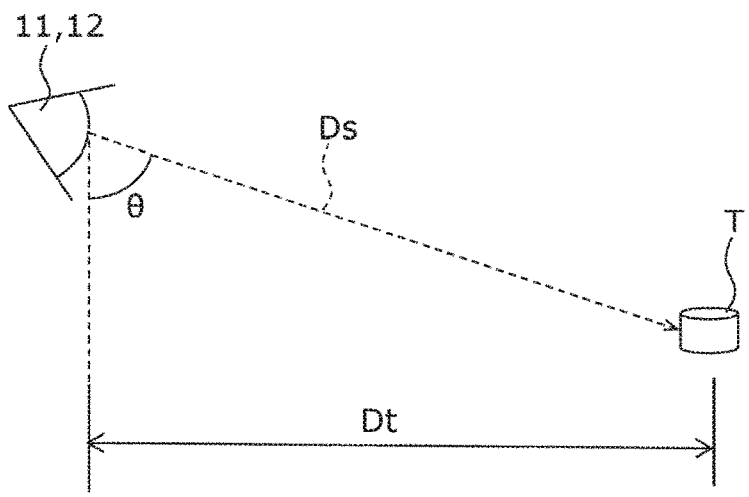
FIG. 6 is a diagram schematically illustrating an example of an imaging direction of a first imaging unit and a second imaging unit in long-distance imaging.

FIG. 5 is a diagram schematically illustrating an example of an imaging direction Ds of the first imaging unit 11 and the second imaging unit 12 in short-distance imaging. FIG. 6 is a diagram schematically illustrating an example of the imaging direction Ds of the first imaging unit 11 and the second imaging unit 12 in long-distance imaging.

In general, in a case where a target object T located near the stereo camera (first imaging unit 11 and second imaging unit 12) is imaged (i.e., case where distance Dt to object is short), the imaging direction Ds is close to the vertical direction (i.e., downward direction) as illustrated in FIG. 5. On the other hand, in a case where the target object T located far from the stereo camera is captured (i.e., case where distance Dt to object is long), the imaging direction Ds is close to the horizontal direction (i.e., lateral direction) as illustrated in FIG. 6.

Therefore, normally, in a case where the imaging direction Ds is close to the vertical direction, the base length Lb of the stereo camera is preferably set to be relatively small, and in a case where the imaging direction Ds is close to the horizontal direction, the base length Lb of the stereo camera is preferably set to be relatively large.

Note that the correspondence relationship between the imaging direction Ds and the optimum stereo camera imaging range R0 is not necessarily unique, and may vary depending on the imaging performance such as the angle of view of the first imaging unit 11 and the second imaging unit 12.

For example, it is conceivable that imaging of the target object T located within 5 m from the stereo camera corresponds to short-distance imaging, and imaging of the target object T located 10 m or more away from the stereo camera corresponds to long-distance imaging. On the other hand, depending on the type of the moving body 10, imaging of the target object T located 5 m or more away from the stereo camera can also correspond to short-distance imaging, and imaging of the target object T located within 10 m from the stereo camera can also correspond to long-distance imaging.

Furthermore, in a case where the moving body 10 is provided as a flight vehicle, generally, in a case where the altitude of the moving body 10 is low, short-distance imaging is often desired, and in a case where the altitude of the moving body 10 is high, long-distance imaging is often desired.

Therefore, in general, in a case where the altitude of the moving body 10 is low, the base length Lb of the stereo camera is preferably set to be relatively small, and in a case where the altitude of the moving body 10 is high, the base length Lb of the stereo camera is preferably set to be relatively large.

Note that the correspondence relationship between the altitude of the moving body 10 and the optimum stereo camera imaging range R0 is not necessarily unique, and may vary depending on the imaging performance such as the angle of view of the first imaging unit 11 and the second imaging unit 12. For example, in a case where the altitude of the moving body 10 is less than 1 m from the ground, short-distance imaging is preferable, and in a case where the altitude of the moving body 10 is 1 m or more from the ground, long-distance imaging is preferable. On the other hand, depending on the type of the moving body 10, it is conceivable that short-distance imaging is preferable even when the altitude of the moving body 10 is 1 m or more, and long-distance imaging is preferable even when the altitude of the moving body 10 is less than 1 m.

Note that in a case where a plurality of types of state variables is used for determining the target base length, it is preferable to determine the target base length according to the priority level or a combination of these state variables.

For example, in a case where the target base length is determined on the basis of information regarding the moving speed of the moving body 10 and information regarding the inclination of the imaging direction Ds, more weight may be placed on information regarding the inclination of the imaging direction Ds than information regarding the moving speed of the moving body 10. Alternatively, in a case where the target base length is determined on the basis of information regarding the altitude of the moving body 10 and information regarding the inclination of the imaging direction Ds, more weight may be placed on information regarding the altitude of the moving body 10 than information regarding the inclination of the imaging direction Ds.

A moving body control unit (see FIG. 7 and the like to be described later) that controls the moving body 10 can determine the target base length from the above-described state variable by an arbitrary method.

For example, the moving body control unit may determine the target base length from the state variable by referring to "a data group (reference table) in which the target base length is associated with the state variable" prepared in advance. Such a reference table may be acquired on the basis of an experimental result or a simulation result, or may be acquired as a theoretical value. In a case of determining the target base length using two or more types of state variables, the moving body control unit may use a multi-dimensional reference table. Alternatively, the moving body control unit may determine the target base length by performing calculation according to a predetermined arithmetic expression using the state variable as a parameter.

The moving body control unit controls the base length changing unit 20 so that the base length Lb of the stereo camera is appropriately adjusted to the target base length derived as described above. As a result, the moving body control unit can accurately derive the distance to the target object T on the basis of imaging data acquired by the first imaging unit 11 and imaging data acquired by the second imaging unit 12 regardless of the distance from the stereo camera to the target object T.

As described above, the moving body 10 of the present embodiment can appropriately image both a short-distance object and a long-distance object with one stereo camera depending on the situation.

Therefore, it is not necessary to provide separate stereo cameras for each of short-distance imaging and long-distance imaging, and the number of stereo cameras (specifically, imaging units) mounted on the moving body 10 can be reduced. Therefore, various benefits such as reduction in manufacturing cost, reduction in driving power consumption, simplification of the configuration of the moving body 10, and weight reduction of the moving body 10 can be brought about.

Furthermore, since the above-described base length changing unit 20 can continuously and variably change the base length Lb of the stereo camera, the stereo camera imaging range R0 can also be continuously and variably changed. As a result, as compared with a case where the imaging range (distance measurement range) is switched discretely (discontinuously) by switching the stereo camera to be actually used, the base length Lb of the stereo camera can be made to more precisely correspond to a desired imaging range (distance measurement range).

Furthermore, the moving body control unit can generate a stereoscopic image and a viewpoint transformation image having a high degree of recognition by using the above-described stereo camera image (i.e., captured images of first imaging unit 11 and second imaging unit 12).

Furthermore, the moving body control unit can accurately estimate its self-position and create a map of the surrounding environment on the basis of imaging data acquired by the first imaging unit 11 and imaging data acquired by the second imaging unit 12.

Next, a functional configuration example of the moving body 10 will be described.

Figure 7:
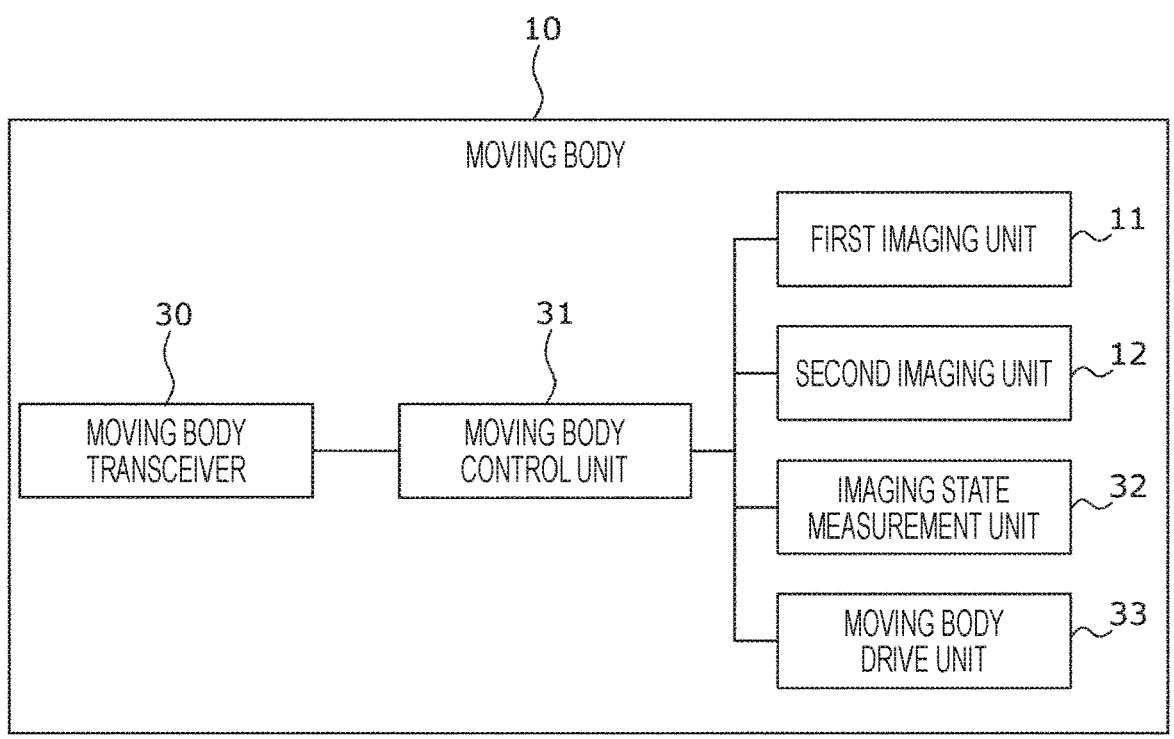
FIG. 7 is a block diagram illustrating an example of a functional configuration of a moving body.
Figure 8:
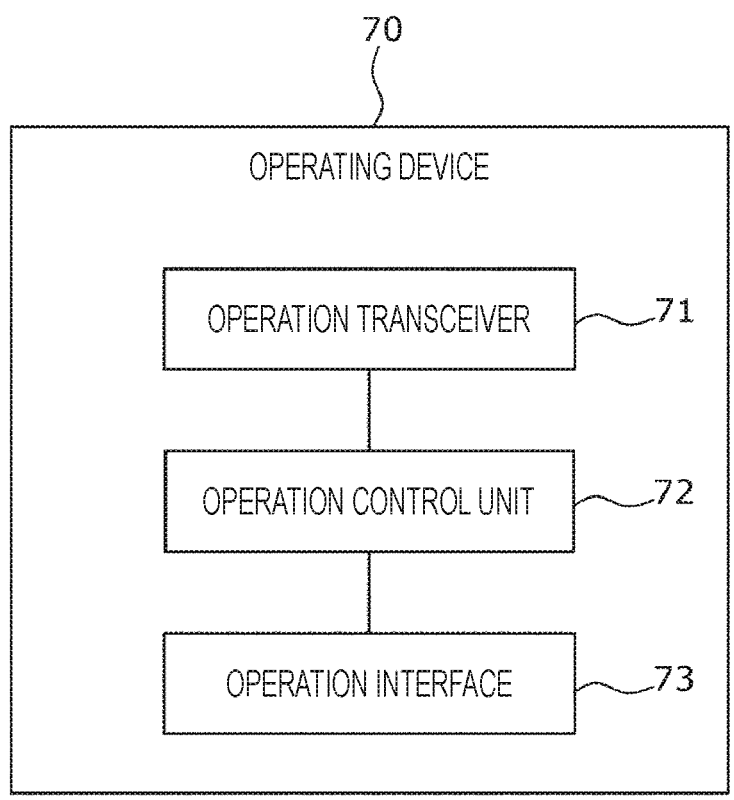
FIG. 8 is a block diagram illustrating an example of a functional configuration of an operating device operated by an operator.

FIG. 7 is a block diagram illustrating an example of a functional configuration of the moving body 10. FIG. 8 is a block diagram illustrating an example of a functional configuration of an operating device 70 operated by the operator.

The moving body 10 illustrated in FIG. 7 includes a moving body transceiver 30, an imaging state measurement unit 32, and a moving body drive unit 33 in addition to the first imaging unit 11, the second imaging unit 12, and a moving body control unit 31 described above.

The moving body transceiver 30 transmits and receives signals to and from the operating device 70 (in particular, operation transceiver 71 to be described later) in a wireless or wired manner.

The imaging state measurement unit 32 measures the state variable and transmits the measurement result (i.e., state variable) to the moving body control unit 31. Therefore, the imaging state measurement unit 32 can include, for example, a sensor that measures information regarding the moving speed of the moving body 10, a sensor that measures information regarding the inclination of the imaging direction Ds of the first imaging unit 11 and the second imaging unit 12, and a sensor that measures information regarding the altitude of the moving body 10.

The sensor that measures information regarding the moving speed of the moving body 10 may include, for example, a sensor that measures the speed of the moving body 10, a sensor (e.g., inertia measurement unit (IMU)) that measures acceleration of the moving body 10, and a sensor that acquires position information of the moving body 10 over time.

Therefore, the speed of the moving body 10 measured by the speed sensor, the acceleration of the moving body 10 measured by the acceleration sensor, and the position information of the moving body 10 obtained over time by a global positioning system (GPS) can be included in the information regarding the moving speed of the moving body 10.

Furthermore, in a case where the moving body 10 is moved using power output from a motor, the output of an encoder attached to the motor can also be included in the information regarding the moving speed of the moving body 10. The output of the encoder can indicate, for example, the number of revolutions (rotation speed), the angle, and the angular velocity of the motor rotation shaft.

The sensor that measures information regarding the inclination of the imaging direction Ds of the first imaging unit 11 and the second imaging unit 12 may include a sensor that measures the attitude (inclination) of the entire moving body 10 and a sensor that measures the attitude (inclination) of the first imaging unit 11 and the second imaging unit 12.

The sensor that measures information regarding the altitude of the moving body 10 may include a sensor that measures the altitude of the entire moving body 10 and a sensor that measures the altitude of individual elements (e.g., first imaging unit 11 and second imaging unit 12) of the moving body 10.

The moving body drive unit 33 drives individual elements included in the moving body 10 under the control of the moving body control unit 31. In particular, the moving body drive unit 33 of the present embodiment includes the base length changing unit 20 (see FIG. 9 described later), and adjusts the base length Lb of the stereo camera (first imaging unit 11 and second imaging unit 12). The moving body control unit 31 controls the moving body drive unit 33 on the basis of drive instruction information from the operating device 70 received via the moving body transceiver 30.

The drive target of the moving body drive unit 33 is not limited, and other elements included in the moving body 10 may be driven. For example, the moving body drive unit 33 may drive elements included in the first imaging unit 11 and the second imaging unit 12 to adaptively adjust the imaging states of the first imaging unit 11 and the second imaging unit 12.

Furthermore, in addition to the drive control of the device, the moving body control unit 31 may perform arithmetic processing and other arbitrary processing. For example, the moving body control unit 31 may analyze captured images acquired by the first imaging unit 11 and the second imaging unit 12, and control the moving body drive unit 33 on the basis of the image analysis result.

Therefore, in the case of the moving body 10 that performs SLAM processing, the moving body control unit 31 may estimate the self-position of the moving body 10 or create a map of the surrounding environment of the moving body 10 on the basis of the analysis results of the captured images acquired by the first imaging unit 11 and the second imaging unit 12. Note that the specific processing method of SLAM (method of estimating self-position and method of creating map of surrounding environment) is not limited, and can be executed by arbitrary processing.

The moving body control unit 31 can be configured by appropriately combining hardware and software, and may be provided as a single unit or may be configured by combining a plurality of units.

On the other hand, the operating device 70 illustrated in FIG. 8 includes an operation transceiver 71, an operation control unit 72, and an operation interface 73.

The operation transceiver 71 transmits and receives signals to and from the moving body 10 (in particular, moving body transceiver 30) in a wireless or wired manner.

The operation control unit 72 can perform arbitrary processing according to an input from the operator via the operation interface 73. For example, the operation control unit 72 transmits information such as drive instruction information via the operation transceiver 71, receives various information via the operation transceiver 71, and performs various calculations required by the operating device 70.

The operation interface 73 is operated by the operator, receives an input from the operator, and transmits the input to the operation control unit 72. The specific form of the operation interface 73 is not limited, and for example, a button, a switch, a touch panel, and a voice recognition device may be included in the operation interface 73.

The specific form of the operating device 70 is not limited. The operating device 70 may be provided integrally with the moving body 10, may be provided separately from the moving body 10, or may be provided movably independently of the moving body 10.

As described above, while the target base length is determined according to the state variable, the state variable can be acquired by an arbitrary method.

For example, in a case where drive instruction information includes information regarding the state variable, the target base length may be determined according to the state variable acquired on the basis of the drive instruction information. In this case, the moving body control unit 31 controls the base length changing unit 20 so that the base length Lb of the stereo camera is adjusted to the target base length according to the state variable acquired on the basis of the drive instruction information.

Furthermore, the target base length may be determined according to the state variable acquired from the imaging state measurement unit 32. In this case, the moving body control unit 31 controls the base length changing unit 20 so that the base length Lb of the stereo camera is adjusted to the target base length according to the state variable acquired from the imaging state measurement unit 32.

In a case where the moving body 10 moves under autonomous control, the target base length is preferably determined according to the state variable acquired from the imaging state measurement unit 32.

Furthermore, in a case where the moving body 10 is moved outside the visible range of the operator, it is difficult to transmit appropriate drive instruction information according to the situation from the operating device 70 to the moving body 10 in a timely manner. Therefore, in this case, too, the target base length is preferably determined according to the state variable acquired from the imaging state measurement unit 32.

Furthermore, a case where the state variable included in the drive instruction information does not necessarily coincide strictly with the current imaging state of the moving body 10 due to an external factor or the like is also assumed.

Therefore, from the viewpoint of using a state variable with high exactitude, the target base length is preferably determined according to the state variable acquired from the imaging state measurement unit 32.

Figure 9:
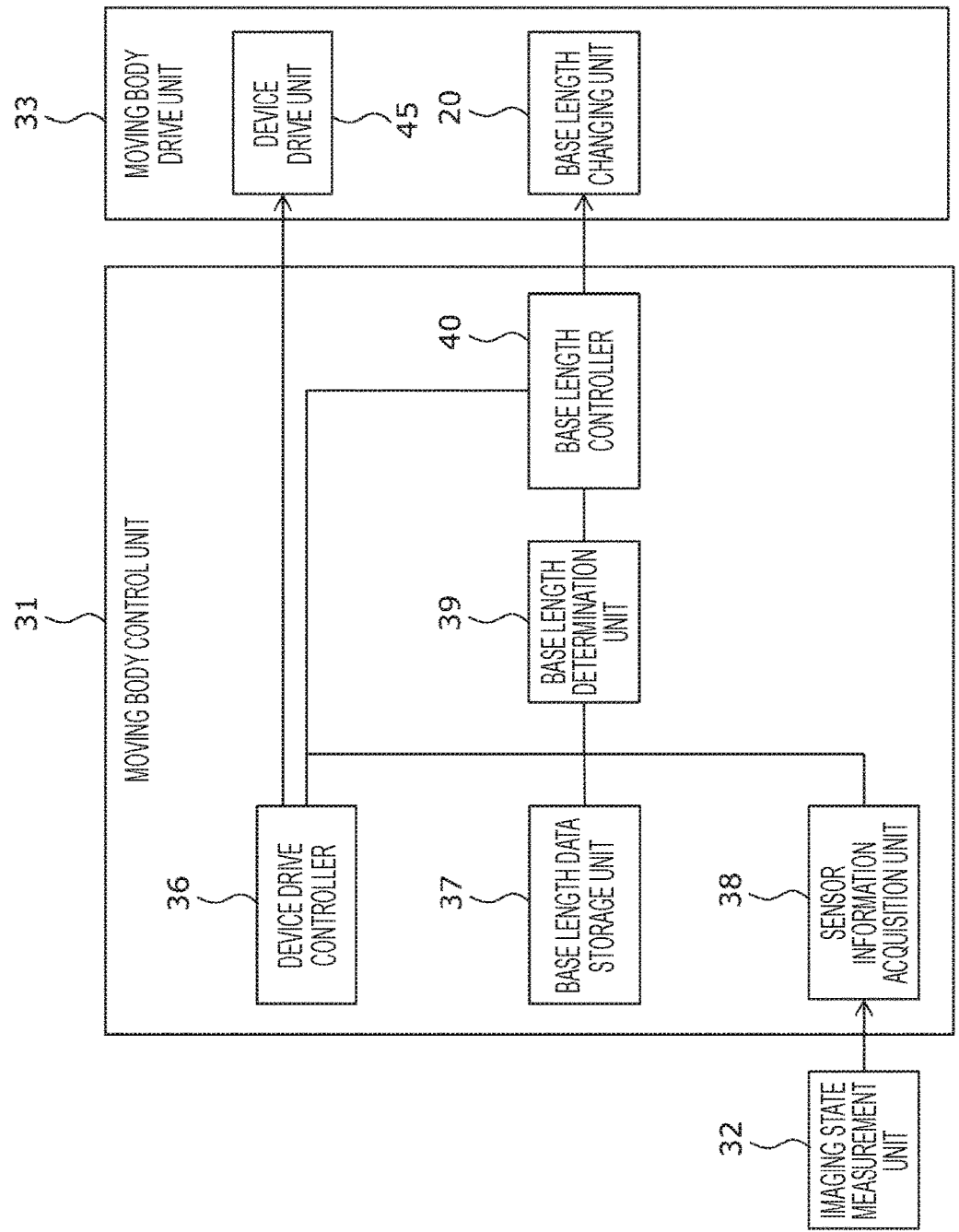
FIG. 9 is a block diagram illustrating a specific example of a functional configuration of a moving body (particularly, moving body control unit).

FIG. 9 is a block diagram illustrating a specific example of a functional configuration of the moving body 10 (particularly, moving body control unit 31).

The moving body control unit 31 illustrated in FIG. 9 includes a device drive controller 36, a base length data storage unit 37, a sensor information acquisition unit 38, a base length determination unit 39, and a base length controller 40.

The device drive controller 36 is a controller that controls various movements of the moving body 10, and for example, controls the movement of the moving body 10. Specifically, the device drive controller 36 transmits a control instruction for driving control of a device drive unit 45 included in the moving body drive unit 33 to the device drive unit 45. The device drive unit 45 drives various elements of the moving body 10 on the basis of a control instruction from the device drive controller 36.

The device drive controller 36 can transmit control information regarding driving of various elements of the moving body 10 to the base length determination unit 39 and the base length controller 40. The device drive controller 36 may include a storage unit (not illustrated), and information (including control information) regarding driving of various elements included in the moving body 10 may be stored in the storage unit.

The base length data storage unit 37 stores the above-described "reference table in which the target base length is associated with the state variable".

The sensor information acquisition unit 38 receives the state variable acquired by the imaging state measurement unit 32 and transmits the state variable to the base length determination unit 39.

The base length determination unit 39 reads the reference table from the base length data storage unit 37. Then, the base length determination unit 39 refers to the reference table to acquire the target base length associated with the state variable sent from the imaging state measurement unit 32 via the sensor information acquisition unit 38. As described above, the base length determination unit 39 illustrated in FIG. 9 is an arithmetic processing unit that makes a comparison between the state variable obtained by the measurement of the imaging state measurement unit 32 and the reference table.

On the basis of the target base length sent from the base length determination unit 39, the base length controller 40 controls the base length changing unit 20 included in the moving body drive unit 33 to adjust the base length Lb of the stereo camera to the target base length.

At this time, the base length controller 40 may control the base length changing unit 20 on the basis of a difference (i.e., base length adjustment amount) between the current base length Lb of the stereo camera and the target base length determined by the base length determination unit 39.

The base length adjustment amount may be calculated by the base length determination unit 39 or may be calculated by the base length controller 40. That is, the base length determination unit 39 may acquire the current base length Lb of the stereo camera from the device drive controller 36 and calculate the difference between the base length Lb and the target base length. Furthermore, the base length controller 40 may acquire the current base length Lb of the stereo camera from the device drive controller 36 and calculate a difference between the base length Lb and the target base length sent from the base length determination unit 39.

Note that while the device drive controller 36, the base length determination unit 39, and the base length controller 40 are represented by separate blocks in FIG. 9, the components may actually be configured by a common device, or may be configured by separate devices.

Next, an example of a processing flow of a method of controlling the moving body 10 (in particular, control method for changing base length Lb of stereo camera) will be described.

Figure 10:
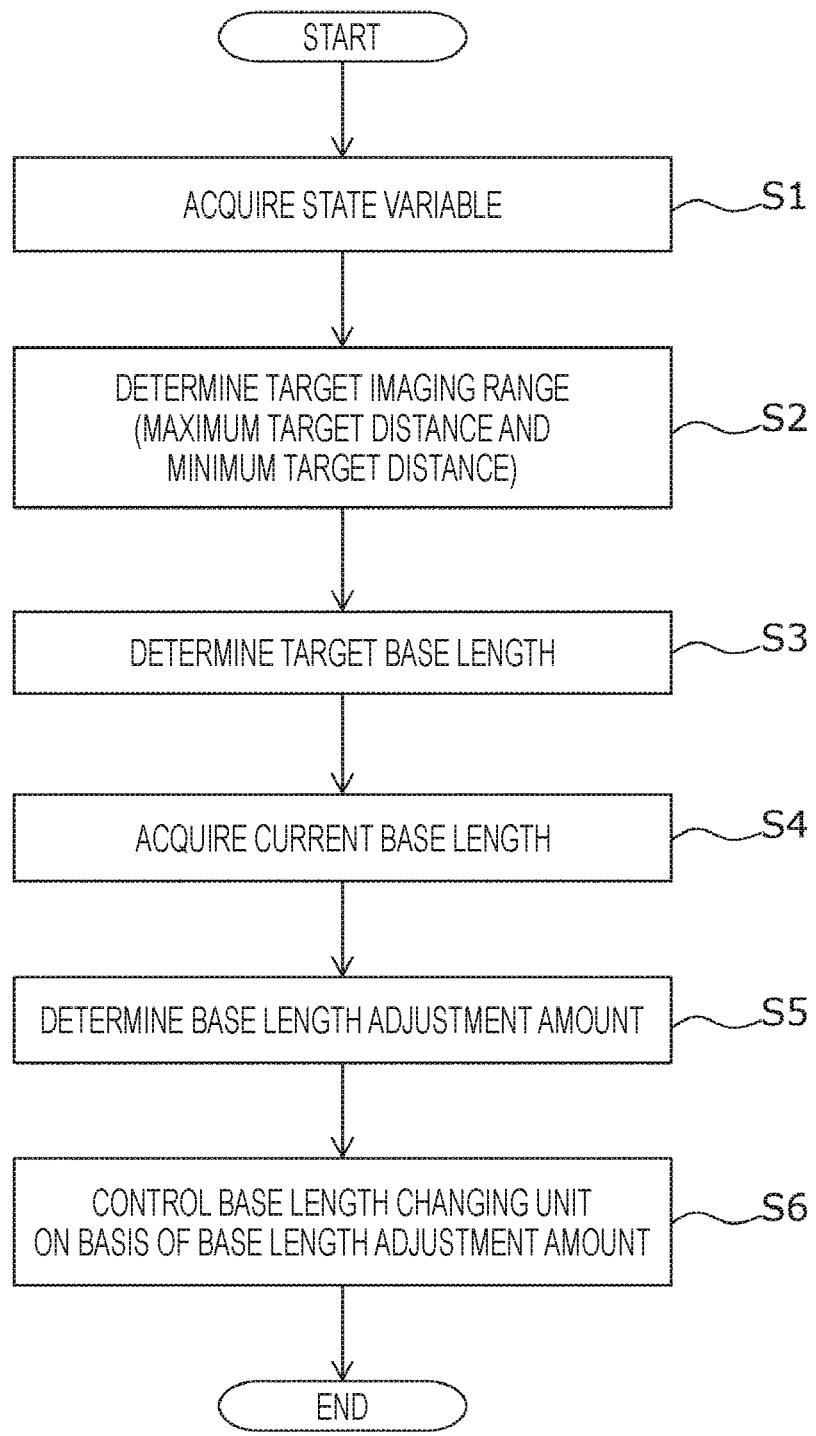
FIG. 10 is a flowchart illustrating an example of a processing flow of a method of controlling the moving body.

FIG. 10 is a flowchart illustrating an example of a processing flow of the method of controlling the moving body 10.

The base length determination unit 39 (see FIG. 9) of the moving body control unit 31 acquires a state variable from drive instruction information sent from the operating device 70 and/or the imaging state measurement unit 32 (S1 in FIG. 10).

Then, the base length determination unit 39 determines a target base length on the basis of the acquired state variable. Specifically, the base length determination unit 39 determines a target imaging range on the basis of the state variable (S2).

The target imaging range is represented by the maximum distance and the minimum distance (i.e., maximum target distance and minimum target distance) in the depth direction of the appropriate stereo camera imaging range R0 according to the state variable. The base length determination unit 39 estimates the maximum target distance and the minimum target distance on the basis of the acquired state variable.

The maximum target distance and the minimum target distance can be estimated by an arbitrary method.

For example, the maximum target distance and the minimum target distance may be determined on the basis of a comparison between the state variable and a threshold. Furthermore, the maximum target distance and the minimum target distance may be determined by comparing the state variable with a table in which the state variable is associated with the maximum target distance and the minimum target distance. The table used here may be held by the base length determination unit 39 or may be appropriately read from a storage unit (not illustrated) of the moving body control unit 31 by the base length determination unit 39.

Then, the base length determination unit 39 determines a target base length on the basis of the target imaging range (S3).

As described above, the stereo camera imaging range R0 is determined according to the base length Lb of the stereo camera. Therefore, the target base length is determined such that the entire target imaging range (i.e., maximum target distance and minimum target distance) is included in the stereo camera imaging range R0 determined according to the target base length.

The specific method of determining the target base length on the basis of the target imaging range is not limited. For example, the target base length may be determined by comparing the target imaging range with a table in which the target imaging range and the target base length are associated with each other. The table used here may be held by the base length determination unit 39 or may be appropriately read from a storage unit (not illustrated) of the moving body control unit 31 by the base length determination unit 39.

Then, the base length controller 40 (see FIG. 9) of the moving body control unit 31 acquires the current base lengths Lb of the first imaging unit 11 and the second imaging unit 12 (S4). The base length controller 40 may acquire the current base length Lb from, for example, the device drive controller 36.

Then, the base length controller 40 determines a base length adjustment amount on the basis of the target base length determined by the base length determination unit 39 and the current base length Lb (S5).

Then, the base length controller 40 controls the base length changing unit 20 on the basis of the determined base length adjustment amount (S6). As a result, the first imaging unit 11 and the second imaging unit 12 move from the current position by a distance corresponding to the base length adjustment amount, and the base length Lb is adjusted to the target base length.

Next, another example of a processing flow of a method of controlling the moving body 10 (in particular, example of control method for changing base length Lb of stereo camera) will be described.

Figure 11:
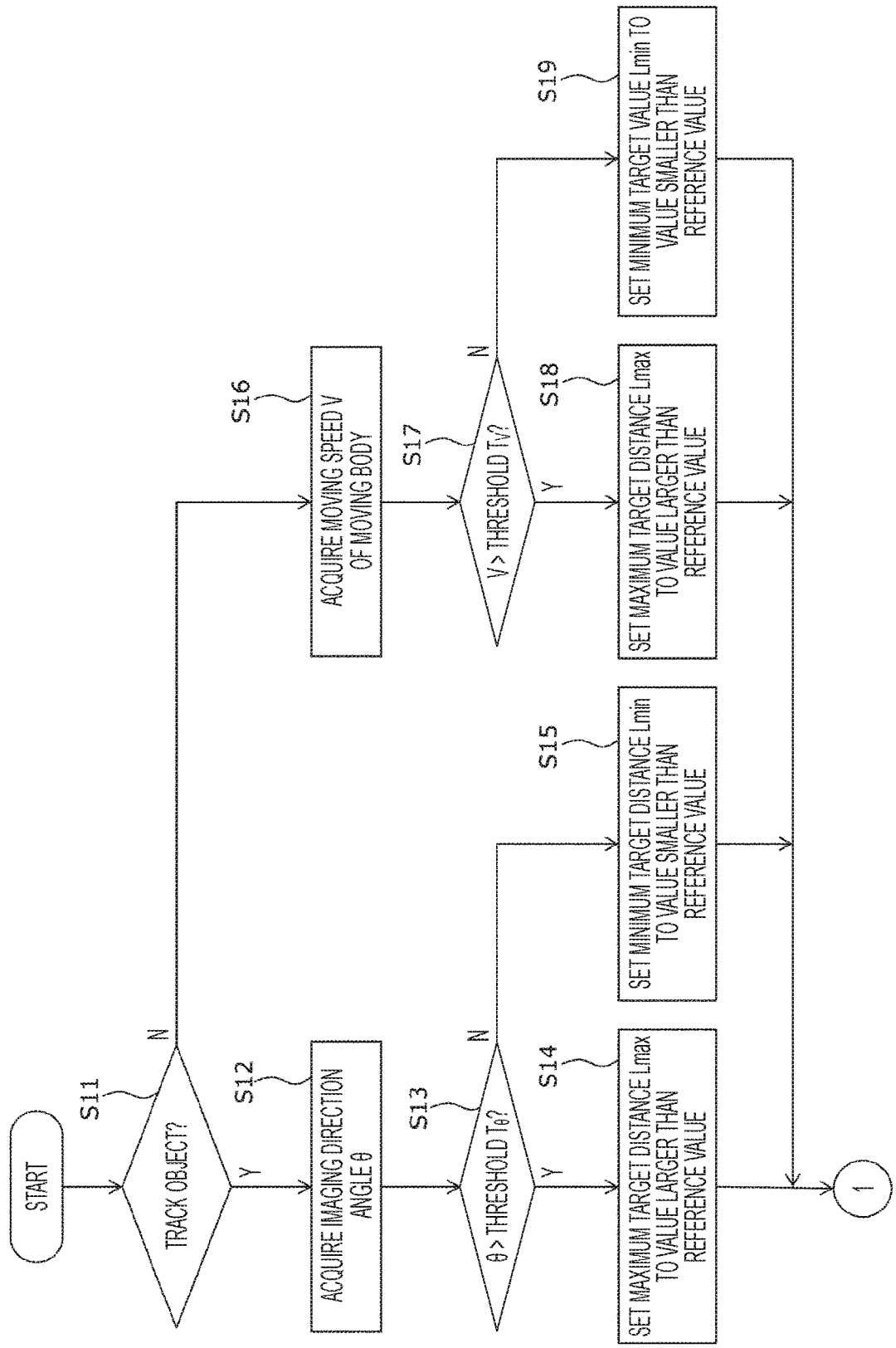
FIG. 11 is a flowchart illustrating another example of a processing flow of the method of controlling the moving body.
Figure 12:
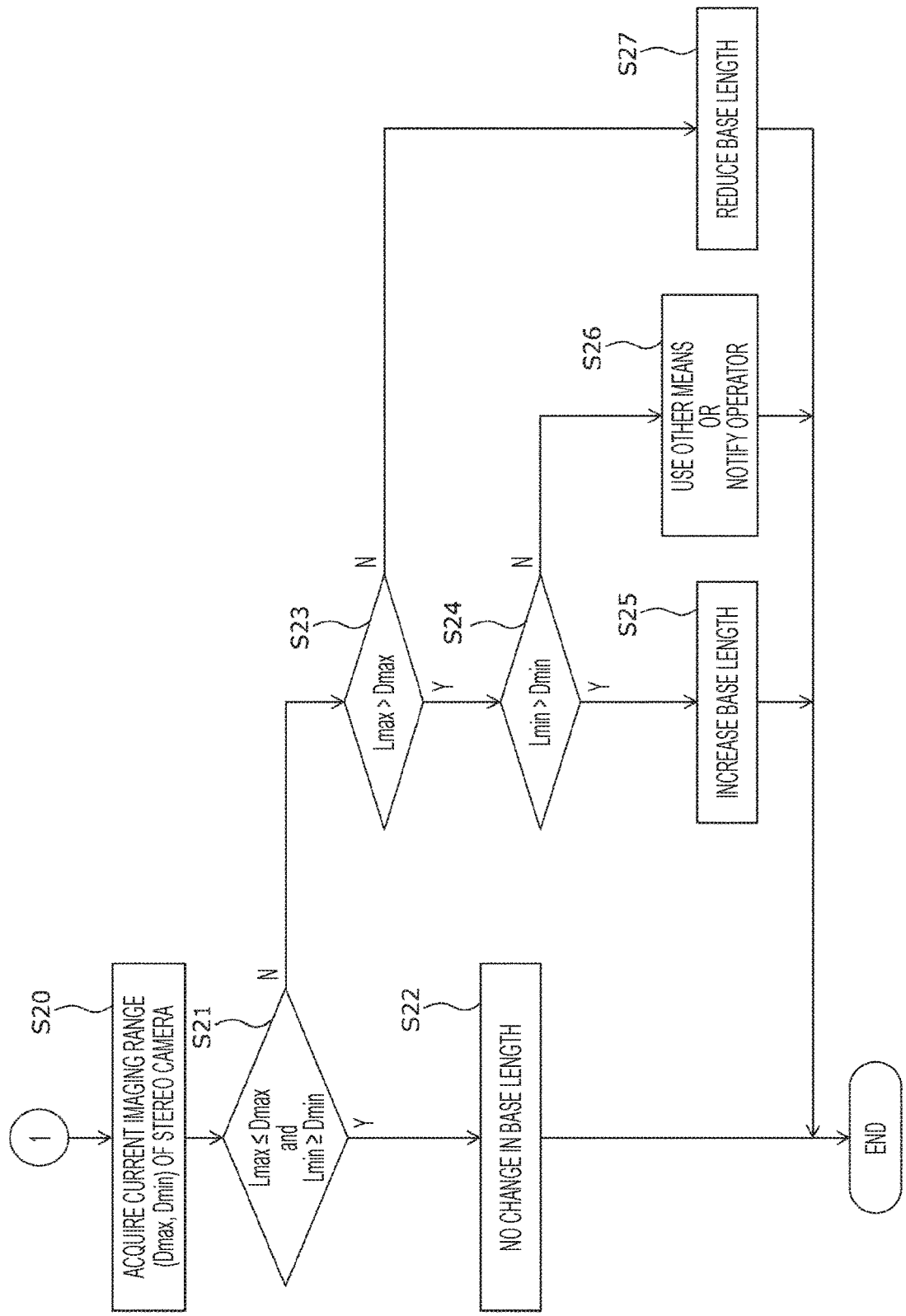
FIG. 12 is a flowchart illustrating the other example of a processing flow of the method of controlling the moving body.

FIGS. 11 and 12 are flowcharts illustrating another example of the processing flow of the method for controlling the moving body 10. While FIGS. 11 and 12 assume a case where the moving body 10 is a flight vehicle (e.g., drone) as an example, the following processing flow is similarly applicable to a case where the moving body 10 is an object other than a flight vehicle.

In the present example, first, whether or not to image an object (i.e., imaging target) while tracking the object is determined by the stereo camera (first imaging unit 11 and second imaging unit 12) mounted on the moving body 10 (S11 in FIG. 11).

For example, in a case where it is necessary to continuously image a specific moving target, it is necessary to image the object (i.e., imaging target) while tracking the object (Y in S11). As an example, in a case where an artist moving around on a stage is imaged, or in a case where the moving body 10 follows a moving person or object, this tracking while imaging is necessary.

On the other hand, in a case where it is not necessary to continuously image a specific target moving around, such as a case where a place itself is monitored, tracking of the object is unnecessary (N in S11).

The determination in step S11 described above is made by the operator. That is, the operator operates the operating device 70 (directly, operation interface 73 (see FIG. 8)) to transmit the information of the determination in step S11 to the moving body 10 (particularly, moving body control unit 31 (see FIGS. 7 and 9)).

In a case where the object needs to be imaged by the stereo camera while being tracked (Y in S11), the base length determination unit 39 of the moving body control unit 31 acquires an angle $\theta$ (state variable) of the imaging direction Ds of the first imaging unit 11 and the second imaging unit 12 (S12).

The base length determination unit 39 may acquire the imaging direction angle $\theta$ from the imaging state measurement unit 32 via the sensor information acquisition unit 38, or may acquire the imaging direction angle $\theta$ on the basis of drive instruction information from the operating device 70. For example, as illustrated in FIGS. 5 and 6, the imaging direction angle $\theta$ of the present example can be expressed by an angle formed by the imaging direction Ds with respect to a line extending in the vertical direction (i.e., supplementary angle with respect to vertical angle).

Then, the base length determination unit 39 determines the magnitude relationship between the imaging direction angle $\theta$ and a threshold $T_\theta$ (S13).

If the imaging direction angle θ is larger than the threshold $T_θ$ ("θ>$T_θ$"; Y in S13), the base length determination unit 39 sets a maximum target distance Lmax to a value larger than the reference value so as to enable long-distance imaging (S14). In this case, a minimum target distance Lmin may be set to a reference value, or may be set to a value according to the maximum target distance Lmax.

On the other hand, if the imaging direction angle θ is equal to or less than the threshold $T_θ$ ("θ≤Tθ"; N in S13), the base length determination unit 39 sets the minimum target distance Lmin to a value smaller than the reference value so as to enable short-distance imaging (S15). In this case, the maximum target distance Lmax may be set to a reference value, or may be set to a value according to the minimum target distance Lmin.

Note that the threshold $T_θ$ may be appropriately determined according to the imaging performance of the stereo camera, may be determined in advance, or may be determined by the operator. Furthermore, the threshold $T_θ$ used for determining the maximum target distance Lmax and the threshold $T_θ$ used for determining the minimum target distance Lmin may be the same or may be different from each other.

On the other hand, if tracking of the object is unnecessary (N in S11), the base length determination unit 39 acquires a moving speed V of the moving body 10 (S16).

The base length determination unit 39 may acquire the moving speed V from the imaging state measurement unit 32 via the sensor information acquisition unit 38, or may acquire the moving speed V on the basis of drive instruction information from the operating device 70.

Then, the base length determination unit 39 determines whether or not the moving speed V of the moving body 10 is higher than a threshold $T_V$ (S17).

If the moving speed V is higher than the threshold $T_V$ ("V>$T_V$"; Y in S17), the base length determination unit 39 sets the maximum target distance Lmax to a value larger than a reference value so as to enable long-distance imaging (S18). In this case, a minimum target distance Lmin may be set to a reference value, or may be set to a value according to the maximum target distance Lmax.

On the other hand, if the moving speed V is equal to or less than the threshold $T_V$ ("V≤$T_V$"; N in S17), the base length determination unit 39 sets the minimum target distance Lmin to a value smaller than a reference value so as to enable short-distance imaging (S19). In this case, the maximum target distance Lmax may be set to a reference value, or may be set to a value according to the minimum target distance Lmin.

Note that the threshold $T_V$ may be appropriately determined according to the imaging performance of the stereo camera, may be determined in advance, or may be determined by the operator. Furthermore, the threshold $T_V$ used for determining the maximum target distance Lmax and the threshold $T_V$ used for determining the minimum target distance Lmin may be the same or may be different from each other.

Then, the base length determination unit 39 acquires the stereo camera imaging range R0 based on the current base length Lb (S20 in FIG. 12).

In this example, the base length determination unit 39 acquires a maximum imaging distance Dmax indicating the maximum distance of the stereo camera imaging range R0 based on the current base length Lb and a minimum imaging distance Dmin indicating the minimum distance of the stereo camera imaging range R0. The base length determination unit 39 may acquire information of the stereo camera imaging range R0 from the device drive controller 36, or may read information of the stereo camera imaging range R0 from a storage unit (not illustrated).

Note that although the maximum imaging distance Dmax is theoretically infinite, actually, as illustrated in FIG. 2 described above, the distance measurement error increases as the imaging distance increases. Therefore, the maximum imaging distance Dmax and the maximum target distance Lmax at which the distance measurement error is equal to or less than the allowable value (±7.5 m in example illustrated in FIG. 2) may be acquired and determined.

Then, the base length determination unit 39 determines whether or not "Lmax≤Dmax" and "Lmin≥Dmin" are satisfied (S21).

If the maximum target distance Lmax is equal to or less than the maximum imaging distance Dmax and the minimum target distance Lmin is equal to or more than the minimum imaging distance Dmin (Y in S21), the target imaging range is included in the current stereo camera imaging range R0, and thus the base length Lb is not changed (S22).

On the other hand, if "Lmax≤Dmax" and "Lmin≥Dmin" are not satisfied (N in S21), the base length determination unit 39 determines whether or not the maximum target distance Lmax is larger than the maximum imaging distance Dmax (S23).

If "Lmax>Dmax" is not satisfied (N in S23), it is considered that the imaging range is insufficient only on the short distance side (i.e., "Lmax≤Dmax" and "Lmin<Dmin"). Therefore, by controlling the base length changing unit 20, the base length controller 40 reduces the base length Lb of the stereo camera and adjusts the base length Lb to the target base length determined by the base length determination unit 39 (S27). Accordingly, "Lmax≤Dmax" and "Lmin≥Dmin" are satisfied.

On the other hand, if "Lmax>Dmax" is satisfied (Y in S23), the base length determination unit 39 determines whether or not the minimum target distance Lmin is larger than the minimum imaging distance Dmin (S24).

If "Lmin>Dmin" is satisfied (Y in S24), it is considered that the imaging range is insufficient only on the long distance side (i.e., "Lmax>Dmax" and "Lmin≥Dmin"). Therefore, by controlling the base length changing unit 20, the base length controller 40 increases the base length Lb of the stereo camera and adjusts the base length Lb to the target base length determined by the base length determination unit 39 (S25). Accordingly, "Lmax≤Dmax" and "Lmin≥Dmin" are satisfied.

On the other hand, if "Lmin>Dmin" is not satisfied (N in S24), it is considered that the imaging range is insufficient on both the short distance side and the long distance side (i.e., "Lmax>Dmax" and "Lmin<Dmin"). In this case, even if the base length Lb of the stereo camera is adjusted, the stereo camera imaging range R0 cannot be adapted to the target imaging range. Therefore, the moving body control unit 31 (e.g., base length controller 40) uses other means (not illustrated) (e.g., another stereo camera or another distance measuring device such as LIDAR) or notifies the operator (S26).

As described above, according to the processing flow illustrated in FIGS. 11 and 12, the target base length can be determined on the basis of a comparison between the target imaging range and the stereo camera imaging range R0.

That is, the moving body control unit 31 (particularly, base length determination unit 39) acquires the target imaging range (maximum target distance and minimum target distance) on the basis of the state variable, and acquires the stereo camera imaging range R0 (maximum imaging distance and minimum imaging distance) based on the current base length. Then, the moving body control unit 31 can determine the target base length on the basis of the maximum target distance, the minimum target distance, the maximum imaging distance, and the minimum imaging distance, and adjust the base length Lb of the stereo camera to an optimum base length according to the situation on the basis of the target base length.

Note that the processing flow illustrated in FIGS. 11 and 12 is merely an example, and the content of each processing step is not necessarily limited to the above-described processing.

For example, in steps S12 to S15 (see FIG. 11) described above, the angle θ of the imaging direction Ds is used as the state variable. However, another state variable (e.g., altitude of moving body 10) may be used. Similarly, in steps S16 to S19 described above, the moving speed V of the moving body 10 is used as the state variable. However, another state variable (e.g., altitude of moving body 10) may be used.

Furthermore, the target imaging range (i.e., maximum target distance Lmax and minimum target distance Lmin) may be determined on the basis of composite information of two or more types of state variables (e.g., moving speed V of moving body 10, angle θ of imaging direction Ds, and altitude of moving body 10).

[Modification]

In the above-described embodiment, the target base length is determined in the moving body 10 (particularly, base length determination unit 39 of moving body control unit 31). However, a target base length determined in a device (e.g., operating device 70) separate from the moving body 10 may be sent to the moving body 10. For example, the operation control unit 72 of the operating device 70 may derive the target base length on the basis of the state variable acquired from drive instruction information, and the target base length derived in this manner may be sent to the moving body control unit 31 via the operation transceiver 71 and the moving body transceiver 30.

Furthermore, while the stereo camera of the above-described embodiment includes the first imaging unit 11 and the second imaging unit 12, the stereo camera may include any number of two or more imaging units, and the moving body 10 may include three or more imaging units.

It should be noted that the embodiments and modifications disclosed in the present specification are only illustrative in all respects and are not to be construed as limiting. The above-described embodiments and modifications can include various omissions, replacements, and changes without departing from the scope and spirit of the appended claims. For example, the above-described embodiments and modifications may be combined in whole or in part, and embodiments other than the above-described embodiments may be combined with the above-described embodiments or modifications. Furthermore, the effects of the present disclosure described in the present specification are merely examples, and other effects may be provided.

The technical category embodying the above technical idea is not limited. For example, the above-described technical idea may be embodied by a computer program for causing a computer to execute one or a plurality of procedures (steps) included in a method of manufacturing or using the above-described device. Furthermore, the above-described technical idea may be embodied by a computer-readable non-transitory recording medium in which such a computer program is recorded.

The present disclosure can also have the following configurations.

[Item 1]

A moving body including:
  a stereo camera including a first imaging unit and a second imaging unit;
  a base length changing unit that moves at least one of the first imaging unit and the second imaging unit so as to change a base length between the first imaging unit and the second imaging unit; and
  a moving body control unit that controls the base length changing unit such that the base length is adjusted to a target base length according to a state variable indicating information of a variable imaging state of the first imaging unit and the second imaging unit.

[Item 2]

The moving body according to item 1, in which
  the state variable includes information regarding at least one of a moving speed of the moving body, an inclination of an imaging direction of the first imaging unit and the second imaging unit, and an altitude of the moving body.

[Item 3]

The moving body according to item 1 or 2 further including an imaging state measurement unit that measures the state variable, in which
  the moving body control unit controls the base length changing unit such that the base length is adjusted to the target base length according to the state variable acquired from the imaging state measurement unit.

[Item 4]

The moving body according to item 1 or 2 further including a moving body drive unit that drives the moving body, in which:
  the moving body control unit receives drive instruction information and controls the moving body drive unit on the basis of the drive instruction information;
  the drive instruction information includes information regarding the state variable; and
  the moving body control unit controls the base length changing unit such that the base length is adjusted to the target base length according to the state variable acquired on the basis of the drive instruction information.

[Item 5]

The moving body according to any one of items 1 to 4, in which
  the moving body control unit derives a distance to a target object on the basis of imaging data acquired by the first imaging unit and imaging data acquired by the second imaging unit.

[Item 6]

The moving body according to any one of items 1 to 5, in which
  the moving body control unit estimates a self-position and creates a map of a surrounding environment on the basis of imaging data acquired by the first imaging unit and imaging data acquired by the second imaging unit.

[Item 7]

The moving body according to any one of items 1 to 6, in which
  the moving body control unit determines the target base length on the basis of the state variable.

[Item 8]

The moving body according to item 7, in which
  the moving body control unit determines a target imaging range on the basis of the state variable, and determines the target base length on the basis of the target imaging range.

[Item 9]

The moving body according to item 8, in which
the moving body control unit acquires a stereo camera imaging range included in both an imaging range of the first imaging unit and an imaging range of the second imaging unit based on the current base length, and
determines the target base length on the basis of a comparison between the target imaging range and the stereo camera imaging range.

[Item 10]

The moving body according to item 9, in which
the moving body control unit acquires a maximum target distance indicating a maximum distance of the target imaging range and a minimum target distance indicating a minimum distance of the target imaging range on the basis of the state variable,
acquires a maximum imaging distance indicating a maximum distance of the stereo camera imaging range and a minimum imaging distance indicating a minimum distance of the stereo camera imaging range based on the current base length, and
determines the target base length on the basis of the maximum target distance, the minimum target distance, the maximum imaging distance, and the minimum imaging distance.

[Item 11]

The moving body according to any one of items 1 to 10, in which the moving body is provided as a vehicle.

[Item 12]

The moving body according to any one of items 1 to 10, in which the moving body is provided as a flight vehicle.

[Item 13]

A moving body control method including
moving at least one of a first imaging unit and a second imaging unit included in a moving body such that a base length between the first imaging unit and the second imaging unit is adjusted to a target base length according to a state variable indicating information regarding a variable imaging state of the first imaging unit and the second imaging unit.

[Item 14]

A program for causing a computer to execute a procedure of
moving at least one of a first imaging unit and a second imaging unit included in a moving body such that a base length between the first imaging unit and the second imaging unit is adjusted to a target base length according to a state variable indicating information regarding a variable imaging state of the first imaging unit and the second imaging unit.

REFERENCE SIGNS LIST

10 Moving body
11 First imaging unit
12 Second imaging unit
13 Moving body main body
20 Base length changing unit
21 Slide guide
22 Movable stage
23 Movable stage
30 Moving body transceiver
31 Moving body control unit
32 Imaging state measurement unit
33 Moving body drive unit
36 Device drive controller
37 Base length data storage unit
38 Sensor information acquisition unit
39 Base length determination unit
40 Base length controller
45 Device drive unit
70 Operation device
71 Operation transceiver
72 Operation control unit
73 Operation interface
Ds Imaging direction
Lb Base length
R0 Stereo camera imaging range
R1 First imaging range
R2 Second imaging range
T Target object

The invention claimed is:

1. A moving body, comprising:
a stereo camera including a first imaging unit and a second imaging unit;
a base length changing unit configured to move at least one of the first imaging unit or the second imaging unit; and
a moving body control unit configured to:
acquire a state variable that includes information of a variable imaging state of each of the first imaging unit and the second imaging unit;
determine a target imaging range based on the state variable;
acquire a current base length between the first imaging unit and the second imaging unit;
acquire, based on the current base length, a stereo camera imaging range included in an imaging range of each of the first imaging unit and the second imaging unit;
compare the stereo camera imaging range with the target imaging range;
determine a target base length based on the comparison; and
control the base length changing unit to change the current base length to the target base length, wherein the change on the movement of the at least one of the first imaging unit or the second imaging unit.

2. The moving body according to claim 1, wherein the state variable further includes information regarding at least one of
a moving speed of the moving body,
an inclination of an imaging direction of each of the first imaging unit and the second imaging unit with respect to a specific direction, or
an altitude of the moving body.

3. The moving body according to claim 1, further comprising an imaging state measurement unit configured to measure the state variable.

4. The moving body according to claim 1, further comprising a moving body drive unit configured to drive the moving body, wherein
the moving body control unit is further configured to:
receive drive instruction information;
acquire the state variable based on the drive instruction information; and
control the moving body drive unit based on the state variable.

5. The moving body according to claim 1, wherein the moving body control unit is further configured to:
acquire imaging data from each of the first imaging unit and the second imaging unit; and determine a distance to a target object based on the imaging data.

6. The moving body according to claim 1, wherein the moving body control unit is further configured to:
acquire imaging data from each of the first imaging unit and the second imaging unit;
estimate a position of the moving body based on the imaging data; and
create a map of a surrounding environment the moving body based on the imaging data.

7. The moving body according to claim 1, wherein the moving body control unit is further configured to:
acquire, based on the state variable, a maximum target distance indicating a maximum distance of the target imaging range and a minimum target distance indicating a minimum distance of the target imaging range;
acquire, based on the current base length, a maximum imaging distance indicating a maximum distance of the stereo camera imaging range and a minimum imaging distance indicating a minimum distance of the stereo camera imaging range; and
determine the target base length based on the maximum target distance, the minimum target distance, the maximum imaging distance, and the minimum imaging distance.

8. The moving body according to claim 1, wherein the moving body corresponds to a vehicle.

9. The moving body according to claim 1, wherein the moving body corresponds to a flight vehicle.

10. A moving body control method, comprising:
in a moving body that includes a stereo camera including a first imaging unit and a second imaging unit:
acquiring a state variable that includes information of a variable imaging state of each of the first imaging unit and the second imaging unit;
determining a target imaging range based on the state variable;
acquiring a current base length between the first imaging unit and the second imaging unit;
acquiring, based on the current base length, a stereo camera imaging range included in an imaging range of each of the first imaging unit and the second imaging unit;
comparing the stereo camera imaging range with the target imaging range;
determining a target base length based on the comparison; and
moving at least one of the first imaging unit or the second imaging unit to change the current base length to the target base length.

11. A non-transitory computer-readable medium having stored thereon computer-executable instructions which, when executed by a processor of a moving body that includes a stereo camera including a first imaging unit and a second imaging unit, cause the processor to execute operations, the operations comprising:
acquiring a state variable that includes information of a variable imaging state of each of the first imaging unit and the second imaging unit;
determining a target imaging range based on the state variable;
acquiring a current base length between the first imaging unit and the second imaging unit;
acquiring, based on the current base length, a stereo camera imaging range included in an imaging range of each of the first imaging unit and the second imaging unit;
comparing the stereo camera imaging range with the target imaging range;
determining a target base length based on the comparison; and
moving at least one of the first imaging unit or the second imaging unit to change the current base length to the target base length.

* * * * *